United States Patent [19]

Chooljian et al.

[11] 4,204,291

[45] May 27, 1980

[54] APPARATUS FOR REMOVING MOLD AND OTHER DETRITUS FROM RAISINS AND THE LIKE

[76] Inventors: Leo Chooljian, 5442 E. Heaton, Fresno, Calif. 93727; Mehran Chooljian, 805 Lyon, Sanger, Calif. 93657

[21] Appl. No.: 16,157

[22] Filed: Feb. 28, 1979

[51] Int. Cl.² .............................................. A23N 9/00
[52] U.S. Cl. ...................................... 15/3.1; 209/481; 209/506
[58] Field of Search .................. 15/3.1, 3.11, 3.12, 15/3.13, 3.16, 3.19; 209/431–433, 470, 480, 481, 506

[56] References Cited

U.S. PATENT DOCUMENTS

| 1,423,130 | 7/1922 | McCoy | 209/433 |
| 2,001,756 | 5/1935 | Woock | 209/433 |
| 2,104,785 | 1/1938 | Akeyson | 209/308 |
| 2,152,143 | 3/1939 | Martin | 209/458 |
| 2,518,043 | 8/1950 | Mathews | 209/470 X |
| 3,356,509 | 12/1967 | Laval, Jr. | 426/310 |

Primary Examiner—Edward L. Roberts
Attorney, Agent, or Firm—Huebner & Worrel

[57] ABSTRACT

An apparatus for removing mold and other detritus from raisins and the like having an aqueous bath in which the raisins are immersed; an endless conveyor having an inclined, transversely grooved, planar upper run onto which the raisins are deposited from the bath; and a drive mechanism for moving the upper run upwardly in time spaced increments of stepped progression while simultaneously oscillating the conveyor longitudinally so that the mold and other detritus are abraded and shaken from the raisins and conveyed upwardly with the run while the separated raisins gravitate downwardly along the run.

16 Claims, 5 Drawing Figures

APPARATUS FOR REMOVING MOLD AND OTHER DETRITUS FROM RAISINS AND THE LIKE

BACKGROUND OF THE INVENTION

1. Field of the Invention

The present invention relates to an apparatus for removing mold and other detritus from raisins and the like, and more particularly to such an apparatus for use by packers in processing raisins which have become moldy in the vineyard due to rainfall during the normal period of solar drying.

2. Description of the Prior Art

Dried fruits, such as raisins and the like, are usually prepared by exposing them in the field to solar radiation for a period of time. This method of preparation is, of course, only practical in regions where rain does not normally fall in significant quantities during the drying period. When rain does fall during the drying period, the result is often economic disaster for the entire raisin industry. The principal harm resulting from unseasonable rainfall is that mold and decay attack the raisins because of dampness following the rain and because of the protracted drying period required. For example, as a result of unseasonable rainfall in the San Joaquin Valley of California in the fall of 1978, of 94,000 tons of raisins delivered to packers, approximately 77,800 tons were unmarketable because of mold damage. Many thousands of tons were not even delivered because of such damage.

It is well known to attempt to salvage moldy raisins by washing them with hot water. However, mold which forms on raisins which have become damp during the drying period is so closely adherent that it is not sufficiently removed by washing with water. Therefore, it has been attempted to remove the mold by abrasion. However, the mold is so adherent that prior art methods and apparatus which apply sufficient abrasion to remove the mold frequently remove portions of the skin together with the mold. The resulting raisins are not acceptable since their sticky interiors thus exposed cause the raisins to stick together as well as permitting the entry of decay causing organisms.

PRIOR ART STATEMENT

Characterizing the closest prior art of which the Applicant is aware and in compliance with 37 C.F.R. 1.97 and 1.98, attention is invited to the following U.S. Patents, copies of which are enclosed for the Examiner's convenience:

| | |
|---|---|
| Applicant: | John B. Foote |
| Title: | MACHINE FOR STEMMING FRUIT |
| U.S. Pat. No.: | 1,298,488 |
| Issue Date: | March 25, 1919 |
| Remarks: | Shows pitman oscillated screen |
| | |
| Applicant: | Cephas U. Frazier |
| Title: | RAISIN CLEANING APPARATUS |
| U.S. Pat. No.: | 1,762,684 |
| Issue Date: | June 10, 1930 |
| Remarks: | Relevant as to purpose |
| | |
| Applicant: | Arvid M. Erickson |
| Title: | METHOD FOR STEMMING GRAPES |
| U.S. Pat. No.: | 1,924,111 |
| Issue Date: | August 29, 1933 |
| Remarks: | Shows parallel arms 30 supporting shaker trays 28 and 29 for oscillation |
| | |
| Applicant: | Swan M. Akeyson |
| Title: | VIBRATING ENDLESS SCREEN |
| U.S. Pat. No.: | 2,104,785 |
| Issue Date: | January 11, 1938 |
| Remarks: | Shows a vibrating endless conveyor screen for separating sand from drilling mud |
| | |
| Applicant: | Ernest E. Martin |
| Title: | RAISIN CLEANING METHOD |
| U.S. Pat. No.: | 2,152,143 |
| Issue Date: | March 28, 1939 |
| Remarks: | Shows immersion of raisins in a stream of water at 10 or 26 and a shaker conveyor screen 32 mounted for oscillation on parallel arms |
| | |
| Applicant: | William E. Urschel |
| Title: | FRUIT STEMMING MACHINE |
| U.S. Pat. No.: | 2,621,690 |
| Issue Date: | December 16, 1952 |
| Remarks: | Shows pitman oscillated screens supported on parallel arms |
| | |
| Applicant: | Edward J. Vagim |
| Title: | RAISIN WASHING MACHINE |
| U.S. Pat. No.: | 2,830,603 |
| Issue Date: | April 15, 1958 |
| Remarks: | Shows auger conveyor for raisins |
| | |
| Applicant: | Claude C. Laval, Jr. |
| Title: | DRIED FRUIT/TREATING PROCESS |
| U.S. Pat. No.: | 3,356,509 |
| Issue Date: | December 5, 1967 |
| Remarks: | Shows immersion of raisins in hot water preliminary to mold removal, inclined shaker table supported on parallel arms and pitman-eccentric shaker oscillation |

SUMMARY OF THE INVENTION

It is an object of the present invention to provide an improved apparatus for removing mold and other detritus from raisins and the like.

Another object is to provide such an apparatus which effectively removes relatively heavy coatings of mold from dried raisins without also removing salvageable skin to which the mold adheres.

Another object is to provide such an apparatus which will remove surface impurities of all kinds adherent to field dried fruit.

Another object is to provide such an apparatus which can salvage large quantities of raisins which are otherwise unmarketable because of mold resulting from unseasonable rains.

A further object is to provide such an apparatus which is economical to construct, requires little maintenance or adjustment when used to process large quantities of damaged raisins, and is fully effective in removing mold and other detritus from raisins and the like.

DESCRIPTION OF THE PREFERRED EMBODIMENT

Figure 1:
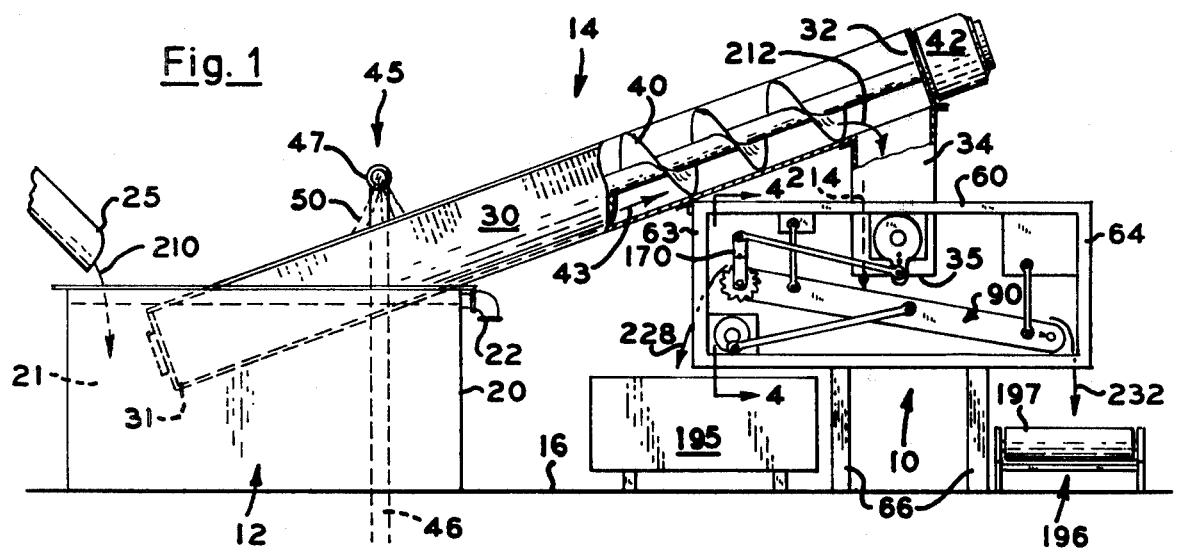
FIG. 1 is a side elevation of an apparatus for removing mold and other detritus from raisins and the like embodying the principles of the present invention.
Figure 2:
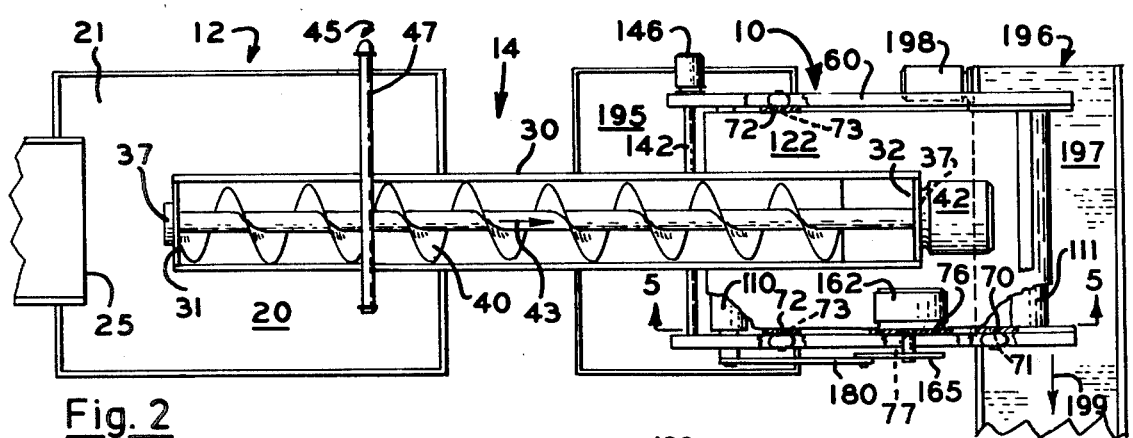
FIG. 2 is a plan view of the apparatus of FIG. 1 with portions broken away for illustrative convenience.

Referring with greater particularity to the drawings, an apparatus for removing mold and other detritus from raisins and the like is shown in FIGS. 1 and 2. The apparatus includes an oscillating conveyor unit 10, depicted at the right of the figures, a tank unit 12 depicted at the left of the figures, and an auger unit 14 extending from the tank unit to a position upwardly of the conveyor unit. These units are supported in any suitable manner as by a floor 16. The tank unit and the auger unit are each of a type well known in the art of processing raisins and the like.

The tank unit 12 includes an upwardly open, rectangular tank 20 rested on the floor 16 and containing a bath 21 of a heated aqueous liquid. The level of the bath is maintained by an overflow 22. A fragmentarily represented discharge end 25 of a chute for supplying untreated raisins is disposed above the tank.

The auger unit has an inclined, U-shaped, upwardly open, elongated trough 30. The trough has a lower transverse planar end 31 and an upper transverse planar end 32. The lower end is submerged in the bath 21 and the upper end is disposed above and centrally of the conveyor unit 10. The trough is mounted on mutually facing portions of the tank 20 and the conveyor unit 10. The auger unit has a spout 34 extending downwardly from the trough at a position adjacent to its upper end. The spout has an open lower end 35 disposed within the conveyor unit 10. To show the interiors of the trough and the spout, portions thereof are depicted as broken away in FIG. 1. The opposite ends of the trough have bearings 37 which are aligned about an axis which extends longitudinally of the trough. An auger screw 40 is rotationally received in the bearings and extends axially between the ends of the trough. The auger unit has a power rotational drive unit 42 mounted axially on the upper end of the trough and connected in rotational driving relation to the screw. The unit rotates the screw in a direction which will urge articles engaged by the screw upwardly as indicated by the arrows 43.

The auger unit 14 has a spray assembly 45 disposed at the end of the tank 20 which is adjacent to the conveyor unit 10. This assembly includes a supply pipe 46 for hot water. The hot water is supplied to the pipe in any suitable manner. The supply pipe extends upwardly from the floor at one side of the tank to a horizontal spray pipe 47 which, in turn, extends from the supply pipe transversely above the trough 30. The spray pipe is provided with downwardly directed perforations, not shown, through which a spray of the liquid issues toward the trough as indicated by the numeral 50.

Figure 4:
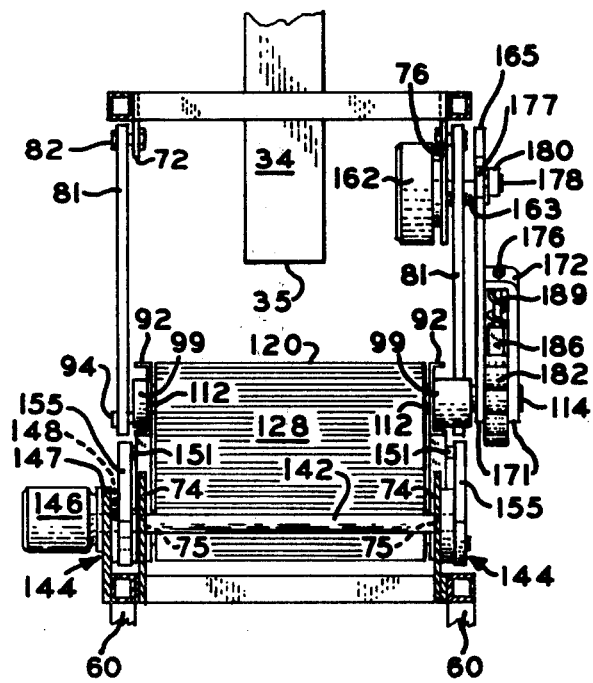
FIG. 4 is a vertical section of the unit taken on line 4—4 of FIG. 1.
Figure 3:
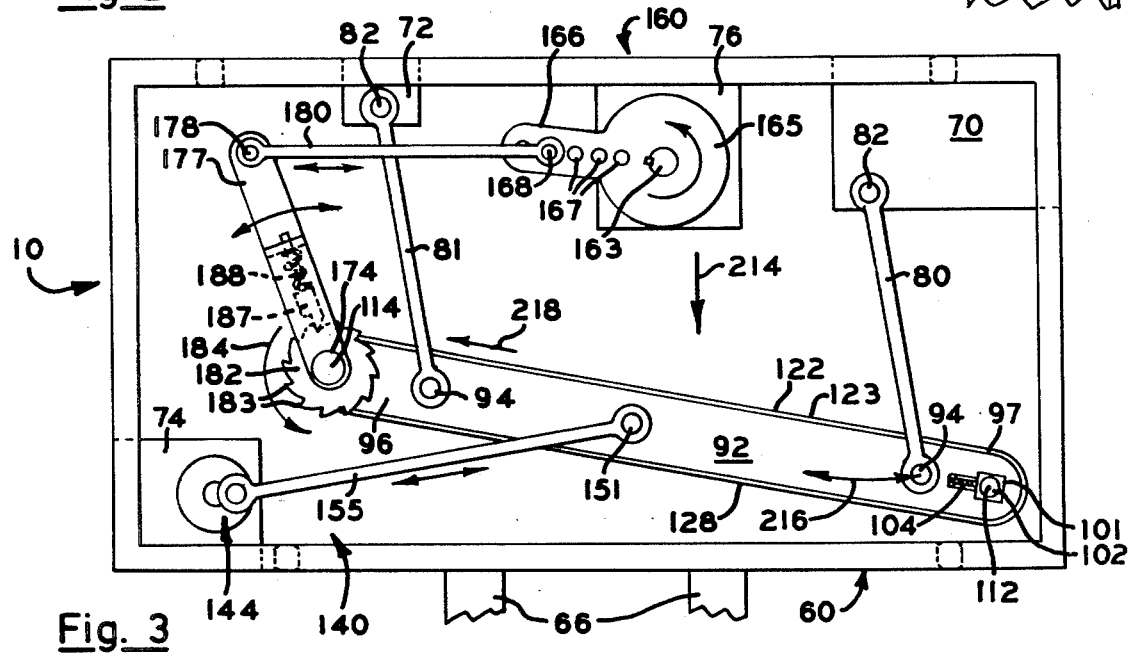
FIG. 3 is a somewhat enlarged side elevation of an oscillating conveyor unit of the apparatus.

As best shown in FIGS. 3 and 4, the oscillating conveyor unit 10 has a horizontally elongated box-shaped frame 60. The longitudinal axis of the frame lies substantially in a vertical plane containing the axis of the screw 40. The frame has a pair of longitudinally opposite end portions 63 and 64 which are disposed, respectively, toward and away from the tank 20. The frame is supported in upwardly spaced relation to the floor 16 by a plurality of legs 66 disposed centrally of the frame so that access below each of said end portions is unimpeded.

The frame 60 has a pair of first mounting lugs 70 disposed upwardly in the frame within its end portion 64 and provided with individual bores 71. The frame has a pair of second mounting lugs 72 disposed upwardly in the frame. These lugs are spaced longitudinally of the frame from said end portion approximately three-fourths of the distance to the opposite end portion 63. Each second lug has a bore 73. The frame has a pair of third mounting lugs 74 disposed downwardly in the frame within said opposite end portion and provided with individual bores 75. The frame has a fourth mounting lug 76 disposed upwardly and longitudinally centrally in the frame on the side thereof which is disposed toward the right of FIG. 4. The fourth lug has a bore 77. Each of the lugs is constructed from a vertical plate which is welded to the frame. The bores of all of the lugs are parallel and extend transversely of the frame through their respective lugs. The two bores through the paired first, second, and third pairs of lugs are axially aligned. The bores of the first lugs are disposed substantially below the bores in the second lugs. The bores of the third lugs are disposed at an elevation which is approximately half-way between the elevations of the bores in the first and second lugs.

The unit 10 has a pair of arms or links 80 individually related to the first pair of mounting lugs 70 and a pair of arms or links 81 individually related to the second pair of mounting lugs 72. The four links extend substantially vertically and are disposed outwardly of the frame from their respective lugs. The upper end of each link is mounted by a bolt assembly 82 on its respective lug for pivotal movement about the axis of the corresponding bore, 71 or 73. Since the links are substantially identical, the lower ends of the links 80 are disposed below the lower ends of the links 81.

The unit 10 has a conveyor 90 mounted on the frame 60 for longitudinal oscillating movement by the links 80 and 81. The conveyor is depicted in FIG. 1 approximately at the midpoint of such movement. In FIG. 2, the conveyor is depicted approximately at the extreme position of such movement which is toward the right of said Figure. The conveyor has a pair of longitudinally extending channels 92 constituting a conveyor frame. Each channel is pivotally mounted on a transversely corresponding pair of the lower ends of the links 80 and 81. Each channel is mounted with its recessed side disposed toward and adjacent to the corresponding pair of said lower ends. These ends are pivotally connected to their channel by individual pins 94. The frame, channels, and links thus form a horizontally elongated parallelogram linkage with the channels forming a lower link thereof. The channels are upwardly inclined approximately 10° with respect to the horizontal. The channels thus have upper ends 96 extended toward the tank 20 from the links 81 and have individual oppositely extended lower ends 97. The upper ends of the channels have individual bearings 99, best shown in FIG. 4, which are aligned about an axis transversely of the channels. A pair of bearing blocks 101, best shown in FIG. 3, are individually mounted on the lower ends of the channels for slidable movement longitudinally therealong. The bearing blocks have individual bores 102 which are aligned about an axis parallel to the axis of said bearings. Each bearing block is provided with a tensioning mechanism 104 of well-known construction to position the block adjustably along the corresponding channel.

Figure 5:
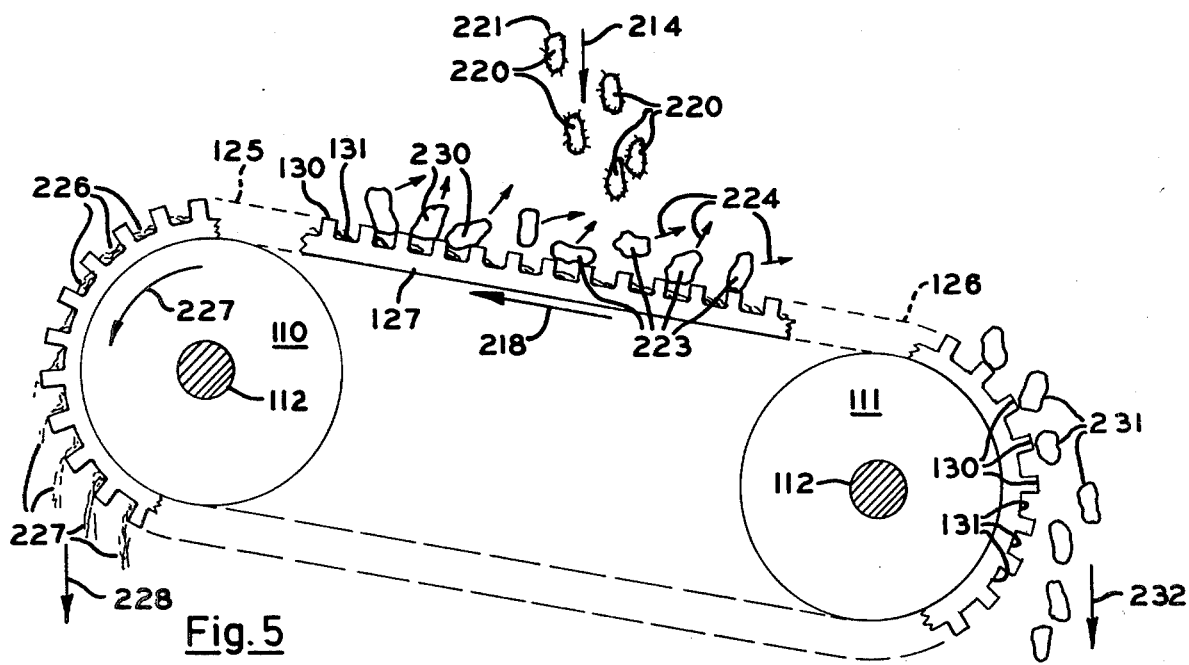
FIG. 5 is a somewhat enlarged vertical section taken from the position represented on line 5—5 in FIG. 2 showing a fragmentarily represented conveyor belt.

As shown in FIGS. 2 and 5, the conveyor 90 has an axially elongated upper pulley 110 disposed within the end portion 63 of the frame. The conveyor has a substantially identical lower pulley 111 disposed within the end portion 64 of the frame. Each pulley extends transversely between the channels 92 and has a pair of axially and oppositely extending stub shafts 112. Said shafts of the upper pulley and the lower pulley, respectively, are rotationally received in the bearings 99 and the bores 102. As shown in FIG. 4, the stub shaft of the upper pulley which extends therefrom toward the side of the frame 60 mounting the fourth lug 76 is provided with an extension 114 which projects outwardly of the frame.

The conveyor 90 has an endless, corrugated belt 120, best shown in FIGS. 3, 4, and 5, in which portions of the belt are broken away or are schematically represented for illustrative convenience. The belt is mounted on the pulleys 110 and 111 so as to provide an upper, generally planar run 122 having an upwardly disposed surface 123. The upper run has an upper portion 125, an opposite lower portion 126, and a central portion 127 disposed therebetween. The belt has a lower return run 128. The outer surface of the belt is provided with a plurality of substantially identical, transversely extending ridges 130. The ridges are substantially equally spaced along the belt defining a plurality of grooves or pockets 131. The grooves and ridges are substantially rectangular when viewed transversely of the belt as in FIG. 5. Preferably, the width of the ridges in a direction longitudinally of the belt is approximately three-thirty seconds (3/32) of an inch. The corresponding dimension of the grooves is substantially less than the smallest dimension of an average raisin, preferably about five-thirty seconds (5/32) of an inch. The depth of the grooves, preferably, is approximately one-eighth (1/8) of an inch. The unit 10 has a first crank mechanism or powered oscillating drive mechanism, indicated generally by the numeral 140 and best shown in FIGS. 3 and 4. This mechanism is mounted on the third lugs 74 of the frame 60 and has a crankshaft 142 which is rotationally received in the bores 75. The crankshaft includes a pair of cranks 144. Each crank is disposed in outwardly adjacent relation to a corresponding third lug. The "throw" of each of the cranks, preferably, is approximately one and one-half (1½) inch. The oscillating mechanism has a power drive unit 146 of any suitable type. This unit is mounted on the frame 60 adjacent to the one of third lugs which is disposed oppositely of the frame from the fourth mounting lug 76. This unit includes a mounting lug 147 which is substantially identical to said one lug and is mounted in alignment therewith. The drive unit has an output shaft 148 which extends from the lug 147 into rotational driving relation with the crankshaft outwardly of the crank which is adjacent to the drive unit. The crankshaft, preferably, is rotationally driven by the unit at approximately one hundred and twenty revolutions per minute. The oscillating mechanism includes a pair of wrist pins 151. These pins are individually mounted on the channels 92 substantially at the longitudinal midpoints thereof and extend therefrom oppositely of the belt 120 about a common axis substantially parallel to the crankshaft 142. A pair of connecting rods 155 individually connect each of the cranks 144 with the transverse wrist pin.

The conveyor unit 10 has a second crank mechanism or ratchet drive mechanism 160 disposed on the side of the frame 60 having the fourth lug 76, that is, to the right of FIG. 4. This mechanism includes a power unit 162 of any suitable type mounted on the side of said lug which faces the center of the frame. This unit includes a rotationally driven output shaft 163 which extends outwardly of the frame through the bore 77. Preferably, this shaft is driven at approximately twenty to twenty-five revolutions per minute. A crank plate 165 having a radially extending arm 166 is mounted on said shaft outwardly of the frame from said lug. The arm is provided with a plurality of bores 167 spaced radially therealong and extending therethrough parallel to said shaft. A selected one of the bores has a crank pin 168 fitted therein. The pin extends from the plate in a direction away from the frame.

The mechanism 160 includes a lever 170 mounted on the stub shaft extension 114 of the upper pulley 110. The lever is of clevis-like shape having a pair of parallel arms 171 extending from a central portion 172. This portion is disposed upwardly of the extension. The arms are provided with individual bores 174 which are aligned and are pivotally fitted to the extension. The lever has a third bore 176 extending through its central portion 172 in a direction normal to the extension. The lever is positioned on the extension with the one of its arms adjacent to the frame aligned longitudinally thereof with the crank plate 165. The lever has an extension 177 which is a prolongation of said one arm. This extension projects upwardly from the central portion of the lever to a distal end disposed approximately at the elevation of the shaft 163. A pin 178 is mounted on the distal end and extends therefrom parallel to said shaft and away from the frame. A connecting rod 180 interconnects said pin with the pin 168 in the crank plate. The distance of the pin 178 from the axis of the upper pulley is substantially greater than the greatest distance the pin 168 can be positioned in one of the bores 167 from the axis of said shaft. As a result, the lever is given an oscillating motion rather than a rotating motion when said plate is rotationally driven.

A ratchet wheel 182 is mounted concentrically on the shaft extension 114 for rotation therewith. The wheel is disposed between the arms 171 of the lever 170 and is provided with a plurality of circumferentially spaced teeth 183. The teeth are of well-known ratchet form having radially extending faces disposed for driving the wheel in a counterclockwise direction, as shown in FIG. 3 and indicated by the arrow 184. A pawl is mounted on the lever between its arms for slidable movement in a direction normal to said extension. The pawl has a tooth-shaped end 187 adapted to engage the teeth of said wheel and has an opposite rod-like end 188 extended through and slidably fitted to the bore 176. A helical spring 189 is mounted about the rod-like end. The opposite axial ends of this spring bear on the center of the lever and on the tooth-shaped end of the pawl so that the spring resiliently urges the pawl into engagement with the wheel.

As shown in FIGS. 1 and 2, the conveyor unit 10 is provided with an upwardly open receptacle 195 rested on the floor 16 downwardly of the frame 60 beneath its end portion 63. Said unit is provided with a fragmentarily represented endles belt conveyor assembly 196 for treated raisins. The assembly has an upper run 197 having an end portion disposed beneath the lower pulley 111. The run continues from said portion transversely away from the frame in a direction which is toward the viewer in FIG. 1 and is downward in FIG. 2. The assembly has a power drive unit 198 disposed in the opposite direction from the frame. This unit motivates said upper run in a direction away from the frame as indicated by the arrow 199 in FIG. 2.

OPERATION

The operation of the described apparatus of the present invention is believed to be clearly apparent and is briefly summarized at this point. As best shown in FIG. 1, the apparatus is supplied through the chute discharge end 25 with raisins to be treated having mold and other detritus adhering thereto. The raisins are gravitationally deposited in the bath 21 from said end, as indicated by the arrow 210. After subjection to the bath, the raisins are picked up by the screw 40 of the auger unit 14 and transported upwardly, as indicated by the arrow 43. As the raisins pass under the spray assembly 45, they are rinsed by the spray 50. Liquid from the spray drains gravitationally along the trough 30 into the bath 21. Excess liquid escapes through the overflow 22 maintaining the bath at the proper level. The mold and other detritus on the raisins are softened by the action of the liquid in the bath and from the spray. The raisins continue upwardly toward the upper end 32 of the trough allowing liquid to drain therefrom. When the raisins reach the spout 34, they enter it as indicated by the arrow 212 and fall from its lower end 35. As indicated by the arrows 214 in FIGS. 1, 3, 4, and 5, the raisins to be treated are thus deposited on the central portion 127 of the upper run 122 where they are supported by the surface 123.

The upper run 122 has two components or movements longitudinally of the conveyor frame 60. One of these movements is a continuous oscillating movement of the entire conveyor 90 derived from the oscillating mechanism 140 and indicated by the arrows 216 in FIG. 3. The oscillating movement is a swinging movement of the conveyor on the links 80 and 81 relative to the frame 60. The links are relatively long in relation to the length of the oscillating movement and, as described previously, the conveyor is suspended by said links so as to swing as a link of a parallelogram linkage. Throughout the oscillatory movement, therefore, the inclination of the upper run in relation to the horizontal does not change and the surface 123 remains substantially in the same plane. The oscillating movement is, as a result, upward and downward in a direction parallel to this plane.

The other movement of the upper run 122 is an intermittent or incremental upward movement derived from the ratchet mechanism 160 and indicated by the arrows 218 in FIGS. 3 and 5. This movement of the upper run 122 is imparted thereto by a corresponding intermittent rotational movement of the upper pulley 110. This rotational movement is derived from pivotal oscillations of the lever 170 about the shaft extension 114. These oscillations result from relative motion of the pin 178 in relation to said extension. Due to ratchet action of the pawl 186 on the teeth 183 of the wheel 182, only such relative pivotal movement of the lever in one direction produces rotation of the wheel and pulley. This direction is toward the left as depicted in FIG. 3 and the resulting rotation is indicated by the arrow 184. Said relative movement of the pin in relation to the shaft extension is imparted from two sources. One of the sources is the power unit 162 which, by continuous rotation of the crank arm 166, oscillates the connecting rod 180 longitudinally of the frame 60. The motion imparted by this source would, of course, occur if the conveyor 90 were stationary in relation to the frame 60. It will be noted, however, that if said crank arm were stationary in relation to the frame, the oscillating movement of the conveyor relative to the frame derived from the mechanism 140 would provide a second source of said pivotal movement of said pin relative to said extension. This source would cause rotation of the upper pulley on the stroke of the oscillating movement of the conveyor 90 which is downward and to the right as depicted in FIG. 3. The incremental upward movement of the run is, therefore, cooperatively derived from the rotation of both the crankshaft 142 and the crank plate 165.

The movements of the lever 170 derived from the mechanisms 140 and 160 have different frequencies and lengths. As a result, the length and frequency of the time spaced increments of stepped progression of the upper run 122 are sequentially varied in a sequence determined by the relative rotational speed of the output shafts 148 and 163, by the throw of the cranks 144, and by the relative distances of the pins 168 and 178, respectively, from the axes of the shaft 148 and the pulley 110. Although the movement of the upper run may at times be momentarily downward during a downward stroke of the conveyor 90, the overall movement in time is upward because of the ratchet action of the pawl 186 on the wheel 182.

Referring now to FIG. 5, raisins 220, which have mold 221 adhering thereto which has been softened by subjection to the bath 21 and spray 50 fall, as indicated by the arrow 214, onto the surface 123 and into engagement with the ridges 130 and grooves 131. Raisins 223 on said surface are shaken by the movements thereof as indicated by the arrows 224 and are abraded against the ridges. Since the incremental movements of the surface are sequentially varied as previously described, the shaking action is adapted to abrade all portions of each raisin and to abrade raisins of various sizes. As the raisins are shaken and abraded, the mold is detached therefrom and gravitates into the grooves, as indicated by the numeral 226. The mold is carried upwardly in the grooves as they travel the upper run 122. As the belt passes around the upper pulley 110, the mold is dumped from the grooves as indicated by the numeral 227. The mold then falls from the conveyor 90, as indicated by the arrows 228, into the receptacle 195 for disposition. Although the mold is received in the grooves, the raisins bridge the grooves as indicated by the numeral 230 in FIG. 5. As a result, the raisins, although shaken in various directions, are gravitationally tumbled along the inclined upper run toward the lower pulley 111. As the raisins travel downwardly along the run, the mold and any other adherent detritus are separated from the raisins. The separated raisins are discharged gravitationally from the conveyor over the lower pulley, as indicated by the numeral 231. The raisins then fall, as indicated by the arrows 232 in FIGS. 1 and 5, onto the upper run 197 of the conveyor assembly 196. The raisins which have been separated from adherent mold and detritus are then transported in the direction of the arrow 199 for any desired subsequent processing or packing operation.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An apparatus for removing mold and other detritus from raisins and the like comprising:
   A. a member having an inclined, generally planar, upwardly disposed surface parallel to a predetermined inclined plane of reference and which has an upper end portion, a lower end portion and pockets therein;
   B. means for depositing raisins to be treated on the surface between said portions; and
   C. means for moving the member substantially parallel to said reference plane with a compound movement having an oscillatory component alternately toward said opposite end portions and an intermittent component progressive toward said upper end portions, whereby the mold and other detritus are separated from the raisins by the pockets and motivated with the progressive component toward said upper end portion, and the separated raisins gravitate toward said lower end portion.

2. The apparatus of claim 1 wherein the oscillatory and intermittent components are coincident.

3. The apparatus of claim 2 wherein said pockets are formed by transversely disposed ridges in said surface which engage the raisins in abrading and shaking relation during said movement and which gravitationally receive the separated mold and other detritus.

4. The apparatus of claim 3 wherein the pockets comprise a plurality of grooves extended transversely of said coincident components between said ridges.

5. The apparatus of claim 4 wherein the width of each pocket in the direction of said components is substantially less than the smallest dimension of the raisins being treated whereby the raisins ride over the pockets and the separated mold and other detritus are received in the pockets and transported toward the upper end portion.

6. An apparatus for removing mold and other detritus from raisins and the like comprising;
   A. means for immersing the raisins in an aqueous bath;
   B. an elongated endless conveyor having a substantially planar upper run providing upwardly disposed pockets;
   C. means mounting the conveyor for oscillatory movement with the upper run inclined approximately ten degrees with respect to the horizontal;
   D. powered means for longitudinally oscillating the conveyor;
   E. ratchet means connected to the conveyor for driving the conveyor in time spaced increments of stepped progression with the upper run traveled upwardly; and
   F. means for conveying raisins from the bath to the upper run of the conveyor whereby mold and other detritus is abraded and shaken from the raisins by the pockets and travel upwardly of the upper run for discharge therefrom and the treated raisins gravitate downwardly along the upper run for discharge therefrom.

7. The apparatus of claim 6 wherein said ratchet means is adapted to drive the conveyor in successive increments which vary sequentially in length.

8. The apparatus of claim 6 wherein the mounting means mounts the conveyor for linear movement as well as oscillatory movement, the ratchet means drives the conveyor in increments of linear movement, and the ratchet means is driven by oscillations of the conveyor.

9. The apparatus of claim 6 wherein said upper run is corrugated having a plurality of substantially parallel grooves extending transversely of the conveyor.

10. The apparatus of claim 9 wherein the width of each groove longitudinally of the conveyor is such that the raisins being treated bridge the grooves and gravitate longitudinally downwardly along the conveyor.

11. An apparatus for removing mold and other detritus adhering to raisins and the like comprising:
    A. an endless belt conveyor having an inclined, generally planar upper run;
    B. a frame;
    C. substantially parallel links suspending the conveyor from the frame for oscillating movement substantially parallel to a predetermined inclined plane of reference whereby the upper run has an upper end and a lower end;
    D. powered means for continuously driving the conveyor in said oscillating movement alternately toward said opposite ends and for driving said run toward said upper end in time spaced incremental movements of stepped progression;
    E. means for delivering raisins to be treated onto the upper run between said end portions thereof, said upper run of the conveyor having a plurality of alternating ridges and grooves in said surface and supporting the raisins thereon in abrading and shaking relation during said oscillating and incremental movements for detaching the mold and other detritus from the raisins, the grooves having a width measured longitudinally of the conveyor substantially less than the diameters of the raisins being treated whereby the mold and other detritus gravitate into the grooves for movement to said upper end and discharge therefrom while the raisins bridge the grooves and gravitate downwardly to said lower end for discharge therefrom;
    F. means for receiving the detached mold and other detritus discharged from said upper end; and
    G. means for receiving the treated raisins from said lower end.

12. The apparatus of claim 11 wherein said grooves are substantially identical, each having a width of approximately five-thirty seconds of an inch and a depth of approximately one-eighth of an inch, and are substantially equally spaced approximately three-thirty seconds of an inch.

13. The apparatus of claim 11 wherein the inclination of said run with respect to the horizontal is approximately ten degrees.

14. The apparatus of claim 11 wherein said powered means for driving the run includes a ratchet mechanism connected in driven relation to the conveyor for motivation by the oscillating movement thereof.

15. The apparatus of claim 14 wherein said powered means includes a first crank mechanism for driving the conveyor in said oscillating movement and a second crank mechanism interconnects the ratchet mechanism and the conveyor for driving the run towards the upper end of the conveyor.

16. An apparatus for removing mold and other detritus from raisins and the like comprising:
    A. a main frame;
    B. an elongated conveyor frame;

C. substantially parallel arms mounting the conveyor frame in the main frame for longitudinal reciprocal movement;
D. an endless conveyor mounted in the conveyor frame having an upper run disposed longitudinally thereof and being longitudinally inclined therein approximately ten degrees from the horizontal whereby the upper run has an upper end and a lower end, said upper run having upwardly disposed pockets therein;
E. means for depositing raisins to be treated on the upper run; and
F. drive means for longitudinally reciprocating the conveyor frame and thus the conveyor to shake mold and other detritus from the raisins into the pockets as the raisins tumble over the pockets to the lower end of the upper run and for motivating the upper run in time spaced increments of stepped progression toward its upper end to carry mold and detritus in the pockets to said upper end of the upper run.

* * * * *